(12) United States Patent
Cox et al.

(10) Patent No.: US 6,510,234 B1
(45) Date of Patent: *Jan. 21, 2003

(54) METHOD FOR INCREASING THE FUNCTIONALITY OF A MEDIA PLAYER/RECORDER DEVICE

(75) Inventors: Ingemar J. Cox, Lawrenceville; Matthew L. Miller, Princeton, both of NJ (US)

(73) Assignee: Signafy, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,409

(22) Filed: May 12, 1999

(51) Int. Cl.[7] .................................................. G06K 9/00
(52) U.S. Cl. ....................................... 382/100; 382/232
(58) Field of Search ................................. 382/100, 232; 434/118; 345/723; 707/4, 9, 102; 713/176, 200, 201; 348/460, 463; 725/32, 34, 35

(56) References Cited

U.S. PATENT DOCUMENTS

| | | | |
|---|---|---|---|
| 5,499,294 | A | 3/1996 | Friedman |
| 5,613,004 | A | 3/1997 | Cooperman et al. |
| 5,646,997 | A | 7/1997 | Barton |
| 5,761,686 | A | 6/1998 | Bloomberg |
| 5,841,886 | A | 11/1998 | Rhoads |
| 5,841,978 | A | 11/1998 | Rhoads |
| 5,862,217 | A | 1/1999 | Steinberg et al. |
| 5,862,218 | A | 1/1999 | Steinberg |
| 5,875,249 | A | 2/1999 | Mintzer et al. |
| 6,154,172 | A * | 11/2000 | Piccioneelli et al. ...... 342/357.1 |
| 6,263,438 | B1 * | 7/2001 | Walker et al. .............. 713/178 |
| 6,285,774 | B1 * | 9/2001 | Schumann et al. ......... 382/100 |
| 6,286,100 | B1 * | 9/2001 | Morimoto et al. .......... 713/176 |

OTHER PUBLICATIONS

Friedman, The Trustworthy Digital Camera, Restoring Credibility To The Photograhic Image, IEEE Transactions on Consumer Electronics, vol. 39, No. 4, pp. 905–910, Nov. 1993.

Hsu, et al., Hidden Signatures In Images, Proceedings of the 1996 IEEE International Conference in Image Processing, ICIP '96, vol. 3, pp. 223–226, 1996.

(List continued on next page.)

*Primary Examiner*—Andrew W. Johns
*Assistant Examiner*—Seyed Azarian
(74) *Attorney, Agent, or Firm*—Scully, Scott, Murphy & Presser

(57) ABSTRACT

A method for utilizing a title signal contained in data through a comparison of the title signal to a player signal stored in a player device is provided. Preferably, the data is digital image, video, or audio data. The method includes the steps of: providing data having the title signal; detecting, at the player device, the title signal in the data: comparing the title signal to the player signal stored at the player device; and performing an action based upon the comparison. In a preferred implementation, the action is performed if the title signal matches the player signal, and the action is to inform the device user of the match and the winning of a prize. In another preferred implementation, the title signal is a subsignal of a watermark signal encoded in the digital data, in which case the method further comprises the steps of: extracting the watermark signal from the digital data; and decoding the subsignal. Also provided are devices, such as DVD players/recorders, for carrying out the methods of the present invention.

61 Claims, 2 Drawing Sheets

OTHER PUBLICATIONS

Kundur, et al., Towards a Telltale Watermarking Technique for Tampering Proofing.

Lin, et al., An Image Authenticator Surviving DCT–Based Variable Quantization Table Compressions.

Lin, et al., A Watermark–Based Robust Image Authentication Method Using Wavelets, Advent Report, Columbia University, Apr. 1998.

Lin, et al., Generating Robust Digital Signature For Image/Video Authentication, Multimedia and Security Workshop at ACM Multimedia '98, Bristol, U.K., Sep. 1998.

Lin, et al., A Robust Image Authentication Method Surviving LPEG Lossy Compression, SPIE Storage and Retrieval of Image/Video Databases, San Jose, CA, Jan. 1998.

Matsui, et al., Video–Stenography: How To Secretly Embed a Signature in a Picture, IMA Intellectual Property Project Proceedings, vol. 1, Issue 1, pp. 187–206, Jan. 1994.

Schneider, et al., A Robust Content Based Digital Signature For Image Authentication, 3rd IEEE International Conference on Image Processing, vol. 3, pp. 227–230, 1996.

Schyndel, et al., A Digital Watermark, IEEE Conference Publication.

Wong, A Public Key Watermark For Image Verification and Authentication.

* cited by examiner

METHOD FOR INCREASING THE FUNCTIONALITY OF A MEDIA PLAYER/RECORDER DEVICE

BACKGROUND OF THE INVENTION

1. Field of the Invention

The present invention relates generally to a method for increasing the functionality of a media player/recorder device and, more particularly, to a method utilizing a title signal contained in digital video or audio data or encoded as a subsignal of a digital watermark signal contained in the digital video or audio data.

2. Prior Art

There is considerable interest in applying watermarking as a complimentary technology to encryption for copy protection of content on DVD video discs. It is currently proposed to insert 4-bits of copy control information. The first 2-bits indicate the copy permission associated with the content, i.e., free-to-copy, copy-once, copy-no-more and never-copy. The other 2-bits are used to control the associated analog copy protection system that prevents VHS recording of copy-no-more and copy-never material. The watermark is expected to code these 4-bits of information and 4 additional bits whose use is not yet defined.

In order for the copy protection system to work, all DVD recorders—preferably all (digital) video recorders—must have watermark detector circuitry that detects a watermark in the video and prevents the compliant DVD player or recorder from performing an illegal action, e.g., recording a copy-never movie. The cost of this detector may be small and is borne by the equipment manufacturers, despite the fact that there is no direct benefit to said manufacturers. In fact, adding copy generation control to DVD players and recorders not only costs manufacturers money but also reduces the functionality of the devices in the view of the consumer, i.e. consumers want to make copies of movies. Of course, both the equipment manufacturer and the consumer indirectly benefit, since without adequate copy protection technology, content owners would not publish their content on this media.

Nevertheless, consumers would like to copy pre-recorded content, and equipment manufacturers are therefore not inclined to install copy protection mechanisms in general and watermark detectors in particular. Thus, legislative and licensing mechanisms are being considered in order to compel the incorporation of copy protection schemes. While such measures are likely to be reasonably successful, it is nevertheless clear that equipment manufactures will only do the minimum necessary to meet their legal obligations.

Ideally, content owners would like to have a copy protection scheme that included increased functionality such that manufacturers and consumers would actually seek out such devices rather than non-compliant devices. Clearly, if a consumer is not permitted to make a copy of a movie, then some other functionality must be provided to compensate for this limitation.

SUMMARY OF THE INVENTION

Therefore it is an object of the present invention to provide a method in which a copy protection scheme adds increased functionality to a player and/or recorder device.

It is a further object of the present invention to provide a method in which a player and/or recorder device having a copy protection scheme is sought after by manufacturers and consumers of the device.

Accordingly, a method for utilizing a "title signal" contained in multiple copies of a title is proposed. Here, title refers to the title of a movie, for example "Waterworld", and the multiple copies refer to say, each copy of the movie that is replicated onto a DVD disk or VHS tape. When a copy of a title is played, the title signal is compared with a player signal previously stored in a player device. Preferably, the data is digital image, video (both of which are hereinafter referred to as image data), or audio data. However, the proposed method is also applicable to analog recording and playback. The method comprises the steps of: providing data having the title signal; detecting, at the player device, the title signal in the data: comparing the title signal to the player signal stored at the player device; and performing an action based upon the comparison.

In a preferred implementation, the action is performed if the title signal matches the player signal, and the action is to notify the device user of the match and the winning of a prize. Other actions are also possible, including allowing the user to view hidden video chapters of the movie or hidden audio tracks. Any action that a user perceives as valuable is a candidate action.

In another preferred implementation, the title signal is a subsignal of a watermark signal encoded in the digital data, in which case the method further comprises the steps of: extracting the watermark signal from the digital data; and decoding the subsignal.

In yet another preferred implementation, the title signal is a subsignal of the copy control watermark signal encoded in the digital data, in which case the method further comprises the steps of: extracting the watermark signal from the digital data; and decoding the subsignal. The benefit of this arrangement is that while the copy control watermark may inhibit illegal recording and playback, it also provides added functionality that outweighs its perceived disadvantage. Consequently, users will actively desire compliant-devices. Of course, the method described need not be technologically coupled to the copy control watermark, but instead, might be coupled by licensing means.

In still another preferred implementation of the present invention, there is provided a method for increasing the functionality of a player device which displays digital image data or emits digital audio data having a watermark signal embedded therein. The method comprises the steps of: detecting, at the player device, the watermark signal in the data; extracting a title signal from the watermark signal; decoding the title signal; comparing the title signal to a player signal stored at the player device indicative of an attribute of the device, device user, data, or data owner; and informing the device user of the winning of a prize if the title signal matches the player signal.

Also provided are devices for carrying out the methods of the present invention.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Although this invention is applicable to numerous and various types of data and player devices, it has been found particularly useful in the environment of digital data, preferably digital video data contained on a DVD disk and in the environment of DVD players and recorders. Therefore, without limiting the applicability of the invention to digital video data and DVD players, the invention will be substantially described in such environment.

Figure 1:
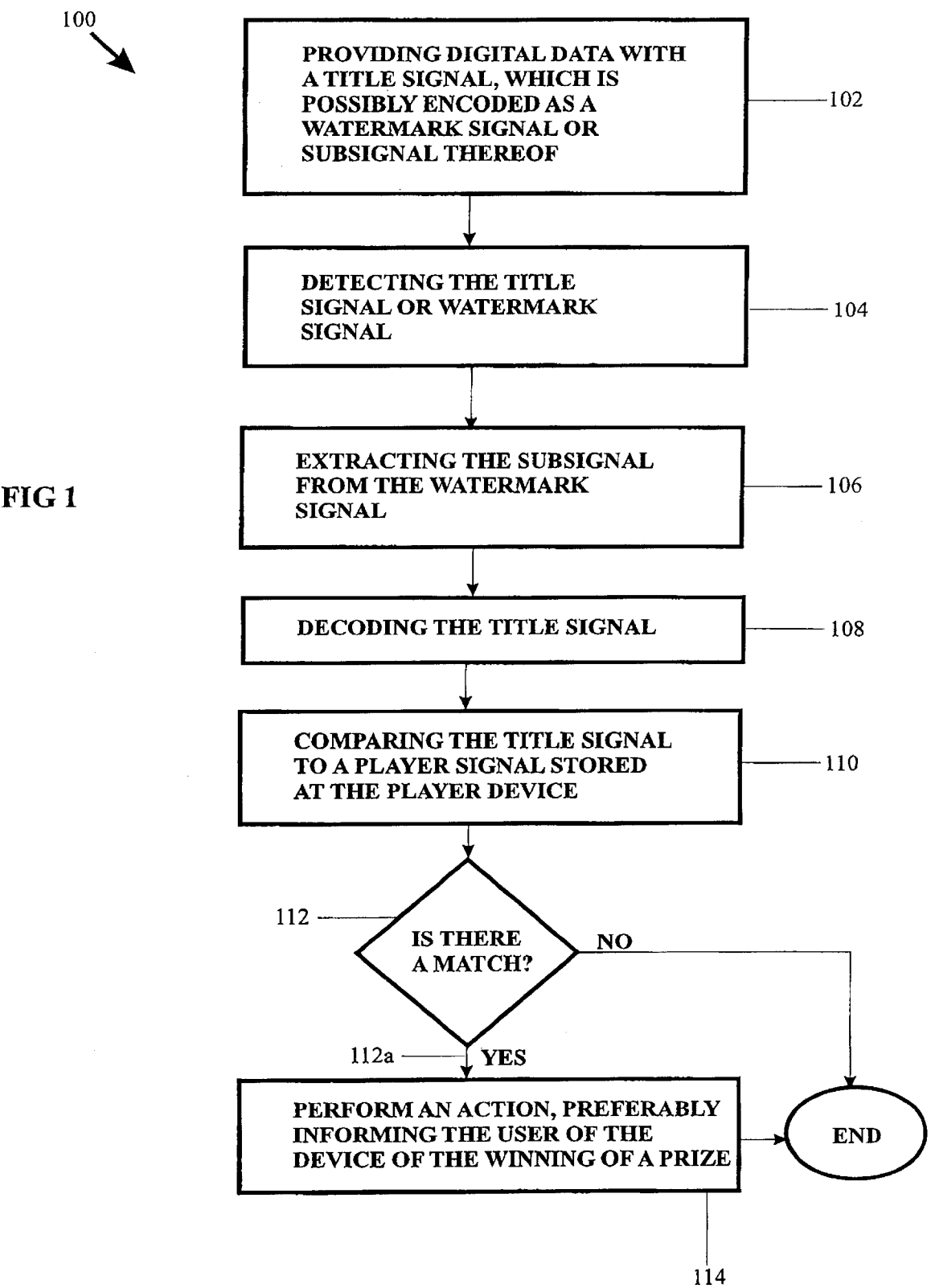
FIG. 1 illustrates a flow chart of a preferred implementation of the methods of the present invention.
Figure 2:
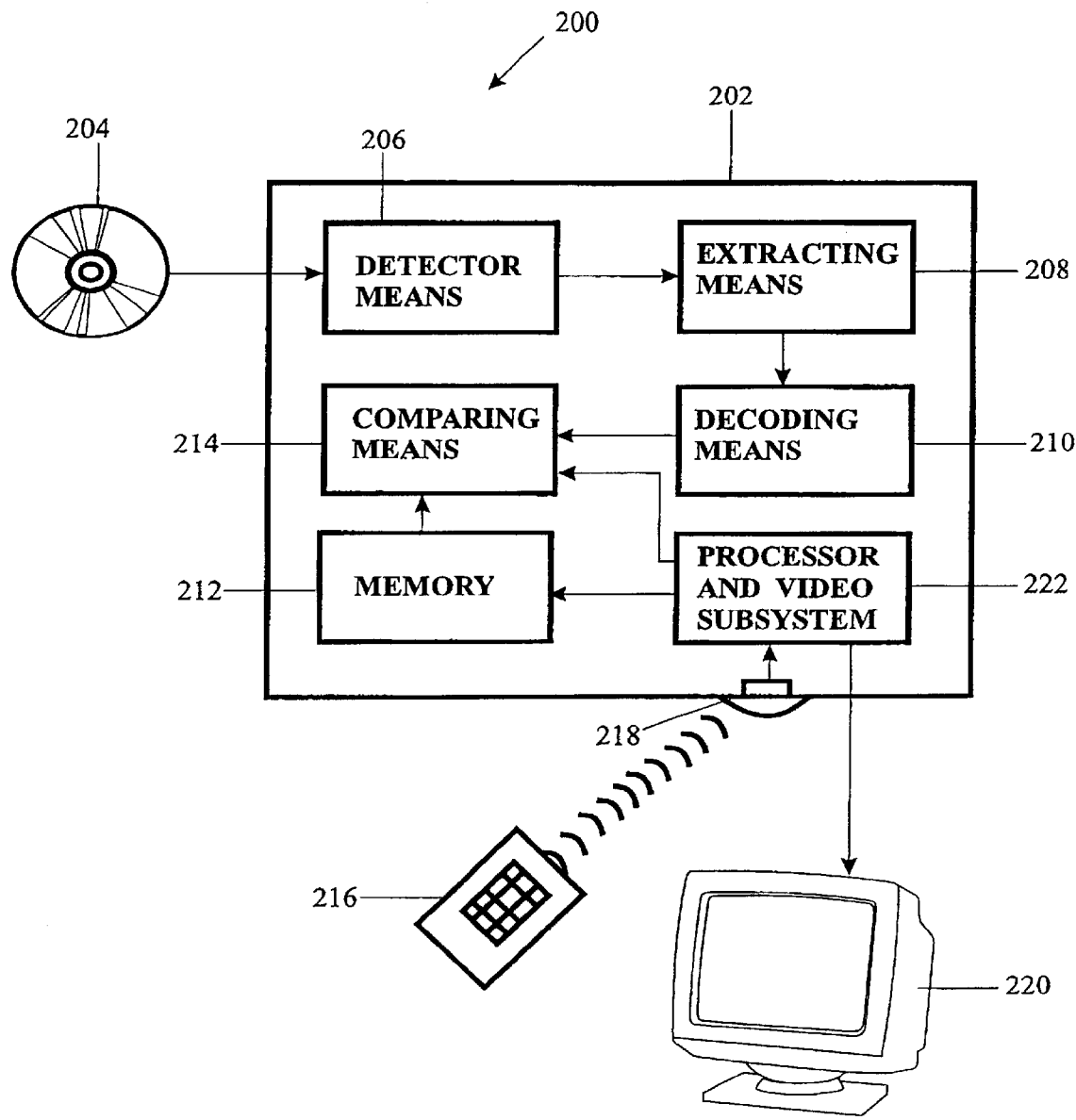
FIG. 2 illustrates a schematical view of a preferred implementation of a device of the present invention.

Referring now to FIGS. 1 and 2, there are illustrated a flow chart of the preferred implementation of the method of the present invention and a schematic illustration of a device for carrying out the methods of the present invention, respectively referred to by reference numerals 100 and 200. The method 100 and device 200 utilizes a title signal contained in data, preferably digital data, for increasing the functionality of a player and/or recorder device 202 (hereinafter referred to as a player), such as a DVD player which displays and/or records the digital data. However, the methods of the present invention can also be implemented in other devices, such as VHS players wherein the title signal is contained on the magnetic tape of the VHS cartridge.

The title signal is defined as any signal extracted from the digital data and ultimately compared to a player signal stored at the player device. In a preferred implementation of the present invention, the title signal is preferably a subsignal of a watermark signal encoded in the digital data. The title signal and the subsignal of the watermark signal are hereinafter used interchangeably to refer to the title signal that is compared to player signal stored in the player 202. Preferably the watermark signal contains a copy protection subsignal of a predetermined number of bits, with the remaining bits being the subsignal which is detected and utilized by the method 100 of the present invention. Currently, the Data Hiding Sub Group of the Copy Protection Technical Working Group specifies an 8-bit watermark, of which 4-bits remain undefined. The additional, unspecified 4-bits of the envisioned watermarking method provides capabilities and increased functionality that both the manufacturer and consumer desire. Thus, the length of the copy protection signal is eight bits, four of which are utilized for copy protection information and one to four of the remaining bits are used to encode the title subsignal. A variety of encodings are possible, especially when these four bits can vary overtime. Thus, many bits (easily 256) can be encoded in a time varying manner within the digital data content. In this manner, the title signal can consists of many bits, e.g. 256, while only requiring at least one bit to vary over time. It is therefore not necessary that all four undefined bits of the watermark be allocated for the purposes of this method. However, one (or more) bits is preferable.

Alternatively, the title signal might be encoded as part of the tag/ticket framework that has also been proposed to support copy generation management. The title signal might even be separate meta-data, though some of the advantage of coupling the title signal to the copy protection system may then be lost. However, this coupling might be accomplished by way of a licensing agreement.

The method 100 comprises a first step at 102 of providing the digital data having the title signal. Content owners would produce the digital data, preferably in the form of a DVD 204 containing digital video data such as a motion picture. However, it will be appreciated by those skilled in the art, that the means for providing the digital data having the title signal can be in any one of many forms and containing any one of possible content. A further variation on the method is to permit a title to have more than one title signal, i.e. some copies would contain one title signal, another set of copies would contain different title signal, etc. In the limit, each copy might contain a unique title signal. However, in practice, this is unlikely, due to the nature of the replication process. At step 104, the device 200 then detects the title signal in the digital data (or the subsignal contained in the watermark signal) by any detection means 206 known in the art.

If the title signal is in the form of a subsignal of a watermark encoded in the digital data, then the watermark must be extracted from the video data at step 106 and decoded at step 108. Any means for extracting a subsignal from a watermark signal 208 and decoding the subsignal 210 known in the art can be utilized for this purpose without departing from the scope or spirit of the present invention.

At this point in the method 100, the title signal is compared at step 110 to a player signal stored in a memory 212 at the player device by any comparison means 214 known in the art. As will be discussed below, it is the preferred implementation of the method to have the player signal be indicative of an attribute of the device, device user, digital data, or digital data owner.

Those skilled in the art will appreciate that the methods and apparatus of the present invention are independent of the copy protection mechanisms that will eventually be adopted by industry. Only steps 102, 104, and 110–114 are essential to practicing the method of the present invention, the remaining steps merely being a preferred implementation of the present invention for use with the copy protection mechanism.

The novel feature of the present invention is that an N-bit signal (referred to as the title signal), be associated with the digital data, e.g., digital video. This may be done in a variety of different ways. For example, the title signal may be inserted as part of a watermark as discussed above.

If the digital data content is a movie, the title signal is preferably identical for all copies of the movie. However, this is not essential, but is most likely, due to the nature of the DVD replication process. When a DVD video movie 204 is played in a DVD player 202, the title signal is detected by hardware (i.e., detecting means 206) in the player 202. This title signal is then compared with the player signal that is preferably unique to each DVD player and which is stored in the memory 212 of the player 202. In its simplest form, the player signal would be an N-bit random number. However, in more sophisticated embodiments of the method, the N-bit player signal might contain fields that identify the manufacturer of the player 200, the model number, serial number as well as programmable fields that contain information relating to the owner's name, address and other personal detail which the user can input into the player 202.

The means for inputting such information can be a remote control device 216 remotely linked to the player 202 via a receiver 218 which inputs the information into the memory 212 through the intermediary of a processor 222 for converting the remote control signals into the player signal recognized by the comparing means 214. The user can alternatively view the inputted data on a monitor 220 while it is being entered. Further fields might contain information on the current time and data. Clearly, other information is also possible without departing from the scope or spirit of the present invention.

At step 112 it is determined whether there is a match of the title signal and the player signal. The matching of the title signal and player signal may be a direct bit comparison or a more flexible regular expression match of characters within corresponding fields of the two numbers, i.e. a perfect match would not be necessary, but approximate matches would also be possible.

When the player 202 determines that its player signal matches the title signal, shown schematically as step 112a, it can inform the user of the match at step 114. A variety of different mechanisms can be used to do this. For example, a overlay screen might appear on the user's TV monitor 220 connected to the player 202, informing the user of the match. Alternatively, the player 202 might jump to a chapter of the video, which might otherwise be hidden from view, which would inform the viewer of the match. Numerous other mechanisms are also possible without departing from the scope or spirit of the present invention.

Thus, the player 202 of the present invention can invoke an action based upon a comparison of information (i.e., the title signal) contained in the digital data content (i.e., movie) and in the player. One possible way to create functionality that is desirable to the consumer is through the use of prize marketing. In the simplest implementation, the player signal would be random and the title signal would match some (approximately) known number of players 202. The movie, or digital content in general, could then be marketed with the opportunity to win, for instance a cash prize, if the title signal contained in the digital data matched the player's player signal.

The viewer might also be instructed to telephone a coordination center to verify the match. The center would not need to know the title signal for the movie, only the set of possible matching player signals. For security reasons, the viewer might only be informed of an encrypted version of the player signal which could be decrypted at the coordination center. In this manner, the same player signal could not be used again and the encryption prevents users from guessing other numbers that might also match.

Many other forms of prizes are, of course, possible, including dinner with the stars of the movie. In fact, the methods of the present invention offer a new variety of "product placement" for studios, since the prize does not actually have to be provided by the studio but might come from a co-marketing company such as MacDonalds. Such an arrangement possibly offers the content owners, such as a movie studio, an additional revenue stream through selling the title signal. Thus, there is a clear financial benefit to the content owners.

The manufacturers of the players, such as DVD equipment, also gain advantages from the methods of the present invention. First, the consumer sees a further distinction between DVD video players and conventional VHS players. In particular, this product differentiation is complimentary to the higher quality of the DVD video over VHS video, which may not be sufficient to persuade users to switch to DVD.

A second advantage is that, if the player signal contains manufacturer information such as make and model, the equipment manufacturers can sell demographic information about the purchasers of their equipment to the (prize) marketers who can in turn choose a title signal that is not random but actually targets a particular demographic group. Thus, there is also a possible financial benefit to equipment providers.

Furthermore, in order for equipment manufacturers to participate in these promotions, content owners could require that the manufacturers enter into a licensing arrangement that guarantees a high level of copy protection.

It will be appreciated by those skilled in the art that although the methods and apparatus of the present invention have been discussed with regard to motion pictures, it is clear that such an approach is also appropriate for the music industry, multimedia and other forms of data content.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for utilizing a title signal contained in data through a comparison of the title signal to a player signal stored in a player device, the method comprising the steps of:

providing data having the title signal;

detecting, at the player device, the title signal in the data:

comparing the title signal to the player signal stored at the player device; and performing an action based upon the comparison.

2. The method of claim 1, wherein the data is digital data.

3. The method of claim 1, wherein the player signal is indicative of an attribute of the device, device user, data, or data owner.

4. The method of claim 2, wherein the title signal is a watermark signal, or a subsignal thereof, encoded in the digital data, wherein the method further comprises the steps of:

extracting the watermark signal from the digital data; and decoding the watermark signal or subsignal thereof.

5. The method of claim 4, wherein the watermark signal contains a copy protection subsignal of a predetermined number of bits, the title signal being a portion of the predetermined number of bits unused by the copy protection subsignal.

6. The method of claim 5, wherein the copy protection signal is eight bits, four of which are utilized for copy protection information and a subset of the four remaining bits are used to encode the title signal.

7. The method of claim 6, wherein all four remaining bits are used to encode the title signal.

8. The method of claim 2, wherein the digital data is digital video data.

9. The method of claim 2, wherein the digital data is digital audio data.

10. The method of claim 1, wherein the action is performed if the title signal matches the player signal.

11. The method of claim 10, wherein the action is to inform the device user of the match and at least one consequence thereof.

12. The method of claim 11, wherein the consequence is informing the user of the winning of a prize.

13. The method of claim 11, wherein the data is digital video data and the consequence is allowing a hidden video chapter to be viewed.

14. The method of claim 11, wherein the data is digital audio data and the consequence is allowing a hidden audio track to be heard.

15. The method of claim 11, wherein the action is to inform the device user of the match and of the player signal, or an encrypted version thereof.

16. The method of claim 15, further comprising the step of confirming, at a third party, that the title signal matches the player signal for preventing fraudulent claims.

17. The method of claim 3, wherein the player signal is indicative of the device user's name, device user's address, device user's social security number, device's serial number, manufacturer's id, and or device's model number.

18. The method of claim 1, further comprising the step of encoding the title signal in a time varying manner.

19. The method of claim 3, further comprising the step of inputting the player signal to the player device prior to the comparing step.

20. The method of claim 19, wherein the inputting step is carried out by a remote control device remotely linked to the player device, the player device having or being connected to a viewing means for viewing the input of the attributes.

21. The method of claim 19, wherein the player device is a DVD player having a remote control device linked thereto, the DVD player further being connected to a monitor for viewing the input attributes.

22. The method of claim 10, wherein perfect matching between the title signal and player signal is necessary in order to perform the action.

23. The method of claim 10, wherein imperfect or approximate matching between the title signal and player signal is permitted in order to perform the action.

24. The method of claim 10, wherein the title signal and player signal contain at least two fields, each field comprising a group of bits, wherein matching of fields between the title signal and player signal is permitted in order to perform the action.

25. The method of claim 1, wherein at least one title signal which when compared to the player signal evokes the performance of the action, is sold to a co-marketing company.

26. The method of claim 1, wherein at least one title signal which when compared to the player signal evokes the performance of the action, is chosen to match at least one targeted demographic group.

27. The method of claim 26, wherein demographic information relating to the targeted demographic group is sold to advertisers.

28. The method of claim 1, wherein the action is performed if the title signal matches the player signal and the action is to inform the device user of the match and contact information for communicating with a third party in order to determine a prize.

29. The method of claim 28, wherein the third party requests and collects additional information to determine the prize.

30. A player device for utilizing a title signal contained in data through a comparison of the title signal to a player signal stored at the player device, the device comprising:
   means for providing data having the title signal;
   means for detecting the title signal in the data;
   a memory for storing the player signal;
   means for comparing the title signal to the player signal; and
   means for performing an action based upon the comparison.

31. The device of claim 30, wherein the data is digital data.

32. The device of claim 30, wherein the player signal is indicative of an attribute of the device, device user, digital data, or digital data owner.

33. The device of claim 31, wherein the title signal is a watermark signal, or subsignal thereof, encoded in the digital data, wherein the device further comprises:
   means for extracting the watermark signal from the digital data; and
   a means for decoding the watermark signal or subsignal thereof.

34. The device of claim 33, wherein the watermark signal contains a copy protection subsignal of a predetermined number of bits, the title signal being a portion of the predetermined number of bits unused by the copy protection subsignal.

35. The device of claim 34, wherein the copy protection subsignal is eight bits, four of which are utilized for copy protection information and a subset of the four remaining bits are used to encode the title signal.

36. The device of claim 35, wherein all four remaining bits are used to encode the title signal.

37. The device of claim 30, wherein the digital data is digital video data.

38. The device of claim 30, wherein the digital data is digital audio data.

39. The device of claim 30, wherein the action is performed if the title signal matches the player signal.

40. The device of claim 39, wherein the action is to inform the device user of the match.

41. The device of claim 39, wherein the action is to inform the device user of the match and at least one consequence thereof.

42. The device of claim 41, wherein the consequence is informing the user of the winning of a prize.

43. The device of claim 41, wherein the data is digital video data and the consequence is allowing a hidden video chapter to be viewed.

44. The device of claim 41, wherein the data is digital audio data and the consequence is allowing a hidden audio track to be heard.

45. The device of claim 41, wherein the action is to inform the device user of the match and of the player signal, or an encrypted version thereof.

46. The device of claim 45, further comprising the step of confirming, at a third party that the title signal matches the player signal for preventing fraudulent claims.

47. The device of claim 32, wherein the player signal is indicative of the device user's name, device user's address, device user's social security number, device's serial number, manufacturer's id, and or device's model number.

48. The device of claim 30, further comprising means for encoding the title signal in a time varying manner.

49. The device of claim 32, further comprising inputting means for inputting the attributes to the device prior to comparing the title signal to the player signal.

50. The device of claim 49, wherein the inputting means comprises a remote control device remotely linked to the device, the device having or being connected to a viewing means for viewing the input of the attributes.

51. The device of claim 50, wherein the device is a DVD player having a remote control device linked thereto, and wherein the viewing means is a monitor connected to the DVD player.

52. The device of claim 39, wherein perfect matching between the title signal and player signal is necessary in order to perform the action.

53. The device of claim 39, wherein imperfect or approximate matching between the title signal and player signal is permitted in order to perform the action.

54. The device of claim 39, wherein the title signal and player signal contain at least two fields, each field comprising a group of bits, wherein matching of fields between the title signal and player signal is permitted in order to perform the action.

55. The device of claim 30, wherein at least one title signal which when compared to the player signal evokes the performance of the action, is sold to a co-marketing company.

56. The device of claim 30, wherein at least one title signal which when compared to the player signal evokes the performance of the action, is chosen to match at least one targeted demographic group.

57. The device of claim 56, wherein demographic information relating to the targeted demographic group is sold to advertisers.

58. The device of claim 30, wherein the action is performed if the title signal matches the player signal and the action is to inform the device user of the match and contact information for communicating with a third party in order to determine a prize.

59. The device of claim 58, wherein the third party requests and collects additional information to determine the prize.

60. A method for increasing the functionality of a player device which displays digital image data or emits digital audio data having a watermark signal embedded therein, the method comprising the steps of:

detecting, at the player device, the watermark signal in the data;

extracting a title signal from the watermark signal;

decoding the title signal;

comparing the title signal to a player signal stored at the player device indicative of an attribute of the device, device user, data, or data owner; and informing the device user of the winning of a prize if the title signal matches the player signal.

61. A player device with increased functionality, the player device displaying digital image data or emitting digital audio data having a watermark signal embedded therein, the player device comprising:

means for detecting, at the player device, the watermark signal in the data;

means for extracting a title signal from the watermark signal;

means for decoding the title signal;

a memory for storing a player signal indicative of an attribute of the device, device user, data, or data owner; and means for comparing the title signal to the player signal; and means for informing the device user of the winning of a prize if the title signal matches the player signal.

* * * * *